Nov. 27, 1934.    E. S. CORNELL, JR    1,982,498
SHEET METAL PIPE FITTING
Filed Aug. 4, 1931
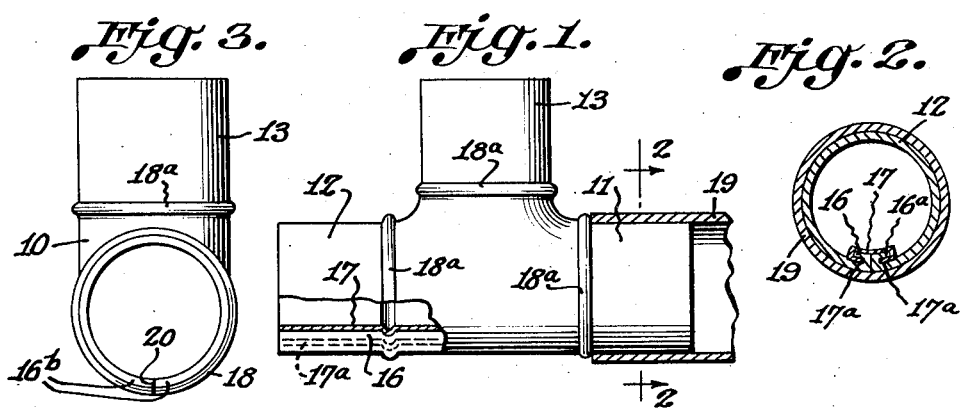
INVENTOR
Edward S. Cornell, Jr.
HIS ATTORNEY Patented Nov. 27, 1934

1,982,498

UNITED STATES PATENT OFFICE 1,982,498

SHEET METAL PIPE FITTING

Edward S. Cornell, Jr., Watertown, Conn.

Application August 4, 1931, Serial No. 555,032

2 Claims. (Cl. 137—75)

This invention relates to T's and other fitting units for metal pipes, tubes and the like.

My invention is particularly directed to T's and other metal fittings, which as complete elements are made from sheet metal by blanking, drawing, forming, folding and/or other mechanical steps or operations.

An essential feature of my invention is that each individual fitting is derived as a complete fitting unit, and is of a form adapted to be secured to a pipe or tube to provide a continuous flow passage from said pipe or tube to one or more connecting pipes or tubes.

Among the advantages inherent in my invention is that of being able to make a tubular fitting with a branch connector sufficiently long or high to provide proper security by sweating, soldering, brazing, or welding a pipe or tube thereto which it is impossible to make from a drawn tube or pipe, as well as the low cost of production of the individual fitting element, the utilization of the element as a complete unit by the plumber or other installer, the avoidance of punching, reaming and/or other mechanical operations on the wall of a pipe or tube for forming a branch or other joint, etc., and particularly the adaptabilty of fittings embodying my invention with the use of welding and other securing means or materials.

The securement by sweating, soldering, brazing, etc., of the various forms of my fitting to one or more pipes or tubes is had by either exterior or interior telescopic relation therewith, the mutually telescoping parts being dimensioned to provide a sufficiently snug fit with a minute clearance to effect the capillary flow of the securing medium during the stage of heating of the mutually telescoping parts, and to entrap the congealed solder upon cooling of the medium and the mutually telescoping parts to attain self-sealing securement.

Further features and objects of the invention will be more fully understood from the following detail description and the accompanying drawing, in which Fig. 1 is a side elevation, partly in vertical section, of a T fitting embodying my invention.

Fig. 2 is a sectional elevation on line 2—2 of Fig. 1.

Fig. 3 is an end elevation of a modification of my invention.

Referring to Figs. 1 and 2 of the drawing, the illustrated T fitting embodies in essence the body 10 having the branches 11, 12, and the neck 13, the body including its branch portions being of complete periphery, usually circular conforming to circular pipes, tubes and the like. In Fig. 1, the branches 11, 12, are shown of equal diameter externally.

Also, as illustrated in Fig. 1, the neck 13 is shown of substantially equal diameter as the respective branches 11, 12. However, the respective diameters of the branches and neck may vary as may be desired, within certain ranges of variation, to telescope externally or internally relative to the joined pipes or tubes of various diameters.

Preferably, my T and other fittings are generally formed from sheet metal of predetermined and proper dimensions, the forming of the branch connection therein by drawing, stamping, drifting, and other procedure, the central or other predetermined portion of the sheet metal to form the periphery of the neck portion and blanking or perforating the bottom or top of said neck portion to accept the required size pipe or tube, the terminal portions of the body portion at the longitudinal edges being grooved or otherwise recessed at 16, 16a and suitably interconnected as under heavy pressure, by a member 17, whose longitudinal edges 17a are upturned and received within the grooves, recesses, etc., 16, 16a under such heavy pressure or equivalent to effect self-sealing.

Such construction embodies the advantage of employing such interconnecting member 17 of material the same or like qualities as the material of the body of the T, and in particular, as illustrated in Figs. 1 and 2, permits the use of relatively thin material for the member 17 as compared with that of the body of the T and especially the longitudinal edge portions 16, 16a.

In addition to the above stated essentials, my T fitting may also include a circular or other suitable exteriorly extending projection 18a, which may be annular or otherwise in contour, to serve as a stop for an interiorly telescoped pipe, tube or the like.

Preferably, my T is formed of sheet metal of the thickness of the magnitude of several hundredths of an inch to provide sufficient strength against puncture or other rupture, but preferably of insufficient thickness for forming a thread or like sealing joint.

To effect sealing securement of the respective branches and neck portions to pipes, tubes, etc., for exterior or interior telescopic joint, soldering, brazing, welding, sweating, or the like is resorted to; suitable provision is made by the proper dimensioning of the overlapping parts for a snug fit and a clearance which is of sufficiently reduced dimension to effect the flow of the securing medium by capillary action, the overlapping parts having been suitably preheated, and to form a self-sealing, firm joint, upon congealing.

As appears in Figs. 1 and 2, the jointing with a pipe, tube, etc. by telescopic connection interiorly with respect to the fitting, in which instance, the butt to butt, compressed, terminal portions 16, 16a are disposed interiorly of the body of the fitting, and similarly interconnected by the member 17 for a self-sealed joint.

Any suitable method of joining the abutting longitudinal edges of the body of the fitting may be employed, whether embodying the interlocking grooved relationship as in the embodiments set forth hereinabove or by butt to butt joint, as is indicated in Fig. 3, the terminal portions 16b being joined by means of solder, brazing, welding, etc. as is indicated at 20, to form a self-sealed joint capable of withstanding the necessary pressure.

My invention is particularly adaptable for forming the fittings of copper, brass, etc. for use with pipes, tubes, etc., of like material, and accordingly, the securement of the fittings to the pipes, tubes, etc., is had at and/or between surfaces of like material, that is to say, copper to copper, brass to brass, etc., and similarly for other suitable material.

To effect sealing securement of the respective branches and neck portions to pipes, tubes, etc., soldering, brazing, welding, sweating, or the like is resorted to, the juxtaposed ends of the pipe or other tube being telescoped relative to one another, either exteriorly or interiorly, the inner diameter of the outer telescoped end being sealed relative to the outer diameter of the inner telescoped end to provide a clearance of sufficiently small magnitude, preferably of capillary range, whereby upon supplying the binding medium to such clearance, and upon cooling of the binding medium, the same forms a self-sealed joint with the respective telescoped ends.

From the above, it will appear that various types of fittings, and particularly T's, are formed integrally of wrought or sheet metal, of the various desired thickness of material, and having ends of desired uniform or desired varied diameters. The type of my invention embodying an interconnecting member similar to the aforesaid interconnecting member 17, but disposed exteriorly of the body of the fitting, and further embodying annular or other interiorly extending projections to serve as a stop for an interiorly telescoped pipe, tube or the like inserted in the branch openings, similar to the aforesaid exteriorly extending projections 18a, is disclosed and claimed in my co-pending application Ser. #589,595, filed Jan. 29th, 1932, entitled Pipe fittings and method of making the same, now U. S. Patent #1,850,049, granted March 15th, 1932.

It will be further observed that the dimension of the hollow neck member is of relatively great length to afford rigid securement of the end of a pipe or a pipe fitting by sweated connection therewith. In such sweated connection, assuming the end of the pipe or of a pipe fitting to be internally relative to the hollow neck member, in which instance the hollow neck member is provided with a smooth inner face, such smooth face extends from the edge of the hollow neck member to a stop located substantially coincident with the junction of the lateral passage and the longitudinal passage through the body. Similarly, assuming also the end of a pipe or pipe fitting to be telescoped internally relatively to each of the hollow end members, each end member is provided internally with a smooth face, which extends inwardly from the edge of the hollow end member to a stop located therein.

Furthermore, in the utilization of embodiments of my invention in connecting relation with pipes or other tubes, preferably of the same or similar material, the interconnections are effected by telescoped coupling of the juxtaposed ends, with or without inwardly or outwardly extending annular or other stop projections, the binding medium dispersing by capillary or surface distributing action within the clearance between the telescoped ends. In the assembly operation, the connected parts being of the same or similar material are heated by the binding medium to like extent, thereby taking advantage of the uniformity of coefficients of expansion, coefficients of heat conductivity. After completion of the assembly, the substantial uniformity of the coefficients of expansion and of heat conductivity and radiation insure permanence of the sealed joint.

My invention also attains the artistic effect by the use of pipes or other tubes with fittings of the same or substantially the same material.

Whereas I have described my invention by reference to specific forms thereof, it will be understood that many changes and modifications may be made without departing from the spirit of the invention. In the claims I used the term "solder" to include the step of sealingly joining the two juxtaposed longitudinally extending edges of the body portion of the fitting by solder or brazing.

I claim:—

1. A threadless pipe fitting comprising a body having a passage extending longitudinally therethrough, hollow end members at each end opening of the longitudinal passage and in substantial alignment with each other and with the longitudinal passage, and a relatively long hollow neck member communicating at its inner end with said longitudinal passage, said body and said hollow neck member being of integral wrought metal of substantially uniform and relatively small dimensioned wall thickness, and said hollow neck member having a length substantially equal to each hollow end member, said neck member having a substantially smooth face of substantially uniform diameter substantially throughout the area of said smooth face to afford a rigid sweated telescoped connection with an end of a pipe or pipe fitting, the material of said body terminating in edge portions disposed within the outer wall dimension of the body, said edge portions abutting one another in a direction extending longitudinally of the body and on a side of the body opposing said neck member, means for securing said abutting edge portions in a self-sealing joint, said hollow end members having each a substantially smooth exterior face of substantially uniform diameter substantially throughout its area to afford a rigid sweated telescoped connection with an end of a pipe or pipe fitting.

2. A threadless pipe fitting comprising a body having a passage extending longitudinally therethrough, hollow end members at each end opening of the longitudinal passage and in substantial alignment with each other and with the longitudinal passage, and a relatively long hollow neck member communicating at its inner end with said longitudinal passage, said body and said hollow neck member being of integral wrought metal of substantially uniform and relatively small dimensioned wall thickness, and said hollow neck member having a length substantially equal to each hollow end member, said neck member having a substantially smooth face of substantially uniform diameter substantially throughout the area of said smooth face to afford a rigid sweated telescoped connection with an end of a pipe or pipe fitting, the material of said body terminating in edge portions disposed within the outer wall dimension of the body, said edge portions abutting one another in a direction extending longitudinally of the body and on a side of the body opposing said neck member, strip means disposed interiorly of the body securing said abutting edge portions in a self-sealing joint, said hollow end members having each a substantially smooth exterior face of substantially uniform diameter substantially throughout its area to afford a rigid sweated telescoped connection with an end of a pipe or pipe fitting.

EDWARD S. CORNELL, JR.